(12) United States Patent
Takeuchi (10) Patent No.: US 9,338,346 B2
(45) Date of Patent: May 10, 2016

(54) FOCUS DETECTION APPARATUS, CONTROL METHOD THEREFOR, AND IMAGE CAPTURE APPARATUS

(71) Applicant: CANON KABUSHIKI KAISHA, Tokyo (JP)

(72) Inventor: Kengo Takeuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/473,606

(22) Filed: Aug. 29, 2014

(65) Prior Publication Data

US 2015/0062389 A1 Mar. 5, 2015

(30) Foreign Application Priority Data

Sep. 2, 2013 (JP) ................................. 2013-181565

(51) Int. Cl.
| | | |
|---|---|---|
| H04N 5/232 | (2006.01) | |
| H04N 9/04 | (2006.01) | |
| H04N 5/369 | (2011.01) | |

(52) U.S. Cl.
CPC ......... *H04N 5/23212* (2013.01); *H04N 5/3696* (2013.01); *H04N 9/045* (2013.01)

(58) Field of Classification Search
CPC .. H04N 5/3696; H04N 5/23212; H04N 9/045
USPC .................. 348/349, 345, 273, 340, 222.1
See application file for complete search history.

(56) References Cited

U.S. PATENT DOCUMENTS

| | | | | |
|---|---|---|---|---|
| 4,410,804 A | 10/1983 | Stauffer | | |
| 9,025,075 B2 * | 5/2015 | Karasawa | .......... | H04N 5/23212 348/340 |
| 9,124,876 B2 * | 9/2015 | Ono | .................... | H04N 13/0217 |
| 2004/0179128 A1 * | 9/2004 | Oikawa | .............. | H04N 5/23212 348/345 |
| 2007/0206940 A1 * | 9/2007 | Kusaka | .................. | G03B 13/28 396/128 |
| 2010/0045849 A1 * | 2/2010 | Yamasaki | ................ | G03B 3/10 348/349 |
| 2014/0146218 A1 * | 5/2014 | Kunieda | ............. | H04N 5/23212 348/345 |
| 2014/0176780 A1 * | 6/2014 | Koshiba | ................... | G02B 7/34 348/336 |
| 2014/0211075 A1 * | 7/2014 | Inoue | ....................... | G02B 7/28 348/349 |
| 2014/0293118 A1 * | 10/2014 | Yanada | ................ | H04N 5/3696 348/350 |
| 2015/0319420 A1 * | 11/2015 | Fettig | ................. | H04N 13/0228 348/49 |

FOREIGN PATENT DOCUMENTS

| | | |
|---|---|---|
| JP | 58-024105 A | 2/1983 |
| JP | 2005-106994 A | 4/2005 |
| JP | 2013-072906 A | 4/2013 |

* cited by examiner

*Primary Examiner* — Tuan Ho
*Assistant Examiner* — Marly Camargo
(74) *Attorney, Agent, or Firm* — Cowan, Liebowitz & Latman, P.C.

(57) ABSTRACT

A plurality of image signals for focus detection are generated from combined signals obtained by combining output signals of a pixel in which a plurality of photoelectric conversion areas obtained by dividing are arranged in a predetermined direction, in units of the photoelectric conversion areas, and the defocus amount is detected based on a correlation amount between the plurality of image signals. The combined signals are generated for each pixel block, for a plurality of pixel block lines in which pixel blocks each having a predetermined size are arranged in the predetermined direction. The pixel data amount for focus detection can be effectively reduced by, in the combining, making combining central points of signals, in the plurality of pixel block lines, shifted relative to each other or phases of positions of the pixel blocks different from each other.

23 Claims, 7 Drawing Sheets

FOCUS DETECTION APPARATUS, CONTROL METHOD THEREFOR, AND IMAGE CAPTURE APPARATUS

BACKGROUND OF THE INVENTION

1. Field of the Invention

The present invention relates to a focus detection apparatus and a control method therefor, and an image capture apparatus using the same, which can be used for an automatic focus detection function.

2. Description of the Related Art

As a focus detection apparatus for detecting a focus state of an imaging optical system, Japanese Patent Laid-Open No. 58-24105 discloses an apparatus that performs focus detection of a so-called pupil-dividing type (also referred to as a phase-difference detection type) using a two-dimensional image sensor in which a microlens is formed in each pixel. According to the focus detection apparatus disclosed in Japanese Patent Laid-Open No. 58-24105, photoelectric conversion area of each pixel included in the image sensor is divided into a plurality of areas, and the divided photoelectric conversion areas receive light beams that pass through mutually different areas in a pupil of an imaging optical system via a microlens.

Furthermore, Japanese Patent Laid-Open No. 2005-106994 discloses an image capture apparatus that performs focus detection of a pupil-dividing type using a CMOS image sensor. According to the image capture apparatus disclosed in Japanese Patent Laid-Open No. 2005-106994, pixels (focus detection pixels) as part of the pixels included in the CMOS image sensor each have two divided photoelectric conversion areas, and are used to detect a focus state of an imaging optical system. Two photoelectric conversion areas included in one focus detection pixel receive light beams that pass through mutually different areas in an exit pupil of the imaging optical system via a microlens.

Furthermore, according to Japanese Patent Laid-Open No. 2013-72906, in the case of performing focus detection of a pupil-dividing type using an image sensor in which a photoelectric conversion area of each pixel is divided into two areas, an image shift amount is obtained from a result of obtaining a correlation data set for one pixel line and adding such correlation data sets of a plurality of successive pixel lines, so that the time necessary for focus detection calculation is shortened.

Performing such focus detection of a pupil-dividing type (imaging plane phase difference AF) using output signals of an image sensor for capturing images is advantageous in that focus detection can be performed at high speed in live view image capture and in that a sensor for focus detection does not have to be additionally provided. Meanwhile, in the configuration in which each pixel has two photoelectric conversion areas, it is necessary to determine as appropriate the amount of pixel data used for focus detection.

For example, if all pixels hold two pixel data sets in order to realize focus detection at any position in the screen, the buffer amount for holding pixel data is twice the conventional amount. Furthermore, if the amount of data held increases, the processing load for pixel data also increases. However, an increase in the processing time causes deterioration in the quality of user experiences such as deterioration in response of the apparatus, and, thus, high-speed processing has to be realized by a method such as performing parallel processing or increasing the operation clock. All configurations for increasing the buffer amount and realizing high-speed processing are costly, and, furthermore, if additional counter-measures against heat are required due to an increase in the amount of heat generated by the high-speed processing, the cost further increases.

SUMMARY OF THE INVENTION

Accordingly, there is a demand for a technique for effectively reducing the pixel data amount for focus detection obtained from an image sensor having a pixel having a plurality of photoelectric conversion areas, and the present invention provides this sort of technique.

According to an aspect of the present invention, there is provided a focus detection apparatus for detecting a defocus amount of an imaging optical system, from output signals of pixels each of which has a plurality of photoelectric conversion areas being divided in a predetermined direction, comprising: a combining unit configured to generate combined signals obtained by combining, in units of the photoelectric conversion areas, output signals obtained from each of a plurality of the pixels; a generating unit configured to generate a plurality of image signals for focus detection, based on the combined signals; and a detecting unit configured to detect the defocus amount based on a correlation amount between the plurality of image signals, wherein the combining unit generates, for a plurality of pixel block lines in which pixel blocks each having a predetermined size are arranged in the predetermined direction, the combined signals for each pixel block, wherein the generating unit generates the plurality of image signals for each pixel block line, and wherein the combining unit generates the combined signals such that central points of the pixel blocks for generating the combined signals, in the plurality of pixel block lines, have shifted relative to each other.

According to another aspect of the present invention, there is provided a focus detection apparatus for detecting a defocus amount of an imaging optical system, from output signals of pixels each of which has a plurality of photoelectric conversion areas being divided in a predetermined direction, comprising: a combining unit configured to generate combined signals obtained by combining, in units of the photoelectric conversion areas, output signals obtained from each of a plurality of the pixels; a generating unit configured to generate a plurality of image signals for focus detection, based on the combined signals; and a detecting unit configured to detect the defocus amount based on a correlation amount between the plurality of image signals, wherein the combining unit generates, for a plurality of pixel block lines in which pixel blocks each having a predetermined size are arranged in the predetermined direction, the combined signals for each pixel block, wherein the generating unit generates the plurality of image signals for each pixel block line, and wherein the combining unit makes phases of positions of the pixel blocks different every pixel block line.

According to further aspect of the present invention, there is provided an image capture apparatus, comprising: an image sensor having the pixels; the focus detection apparatus according to the present invention; and control unit for controlling a focus distance of the imaging optical system according to the defocus amount detected by the detecting unit.

According to yet further aspect of the present invention, there is provided a control method for a focus detection apparatus for detecting a defocus amount of an imaging optical system, from output signals of pixels each of which has a plurality of photoelectric conversion areas being divided in a predetermined direction, comprising: a combining step of generating combined signals obtained by combining, in units of the photoelectric conversion areas, output signals obtained from each of a plurality of the pixels; a generating step of generating a plurality of image signals for focus detection, based on the combined signals; and a detecting step of detecting the defocus amount based on a correlation amount between the plurality of image signals, wherein, in the combining step, the combined signals are generated for each pixel block, for a plurality of pixel block lines in which pixel blocks each having a predetermined size are arranged in the predetermined direction, wherein, in the generating step, the plurality of image signals are generated for each pixel block line, and wherein, in the combining step, the combined signals are generated such that central points of the pixel blocks for generating the combined signals, in the plurality of pixel block lines, have shifted relative to each other.

According to another aspect of the present invention, there is provided a control method for a focus detection apparatus for detecting a defocus amount of an imaging optical system, from output signals of pixels each of which has a plurality of photoelectric conversion areas being divided in a predetermined direction, comprising: a combining step of generating combined signals obtained by combining, in units of the photoelectric conversion areas, output signals obtained from each of a plurality of the pixels; a generating step of generating a plurality of image signals for focus detection, based on the combined signals; and a detecting step of detecting the defocus amount based on a correlation amount between the plurality of image signals, wherein, in the combining step, the combined signals are generated for each pixel block, for a plurality of pixel block lines in which pixel blocks each having a predetermined size are arranged in the predetermined direction, wherein, in the generating step, the plurality of image signals are generated for each pixel block line, and wherein, in the combining step, phases of positions of the pixel blocks are made different every pixel block line.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

Figure 1:
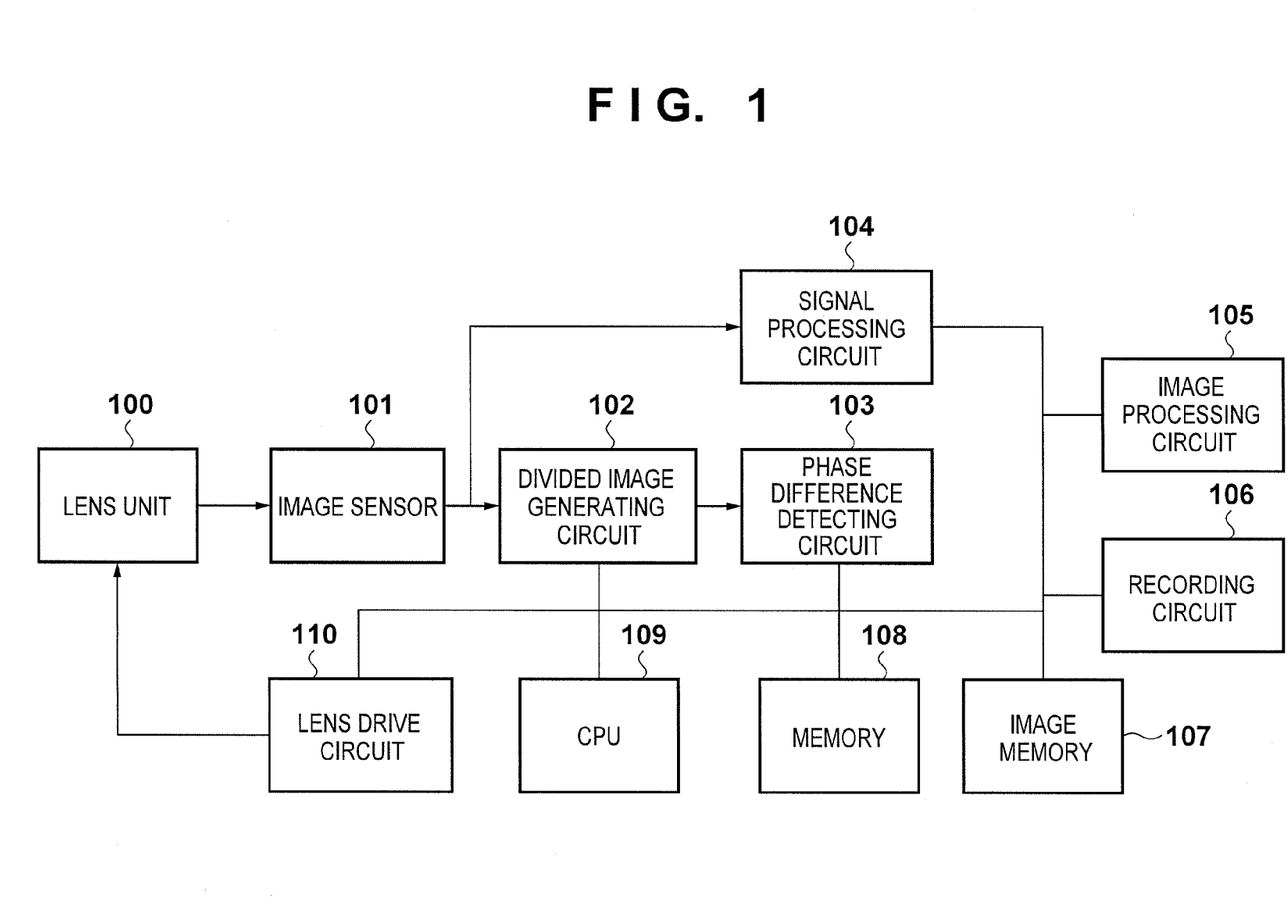
FIG. 1 is a block diagram illustrating an exemplary functional configuration of a digital camera as an example of an image capture apparatus including a focus detection apparatus according to an embodiment.

FIG. 1 is a block diagram illustrating an exemplary functional configuration of a digital camera as an example of an image capture apparatus including a focus detection apparatus according to an embodiment of the present invention. Note that the present invention can be applied to focus detection (defocus amount detection), not only in apparatuses mainly providing an image capture function such as digital (video) cameras, but also in any device having an image capture function using an image sensor. Examples of part of such devices include portable telephones (including smartphones), game consoles, personal computers, tablet terminals, car navigation systems, drive recorders, robots, and the like.

A lens unit 100 that is an imaging optical system includes a focus lens, a zoom lens, a shutter having a diaphragm function, and a CPU 109 controls the operations thereof via a lens drive circuit 110. An image sensor 101 is a CMOS image sensor or the like, where each pixel thereof has two photoelectric conversion areas obtained by dividing and arranged in a predetermined direction. A divided image generating circuit 102 generates image signals for obtaining the defocus amount of the lens unit 100, based on an output obtained from each photoelectric conversion area in each pixel. A phase difference detecting circuit 103 performs processing for correcting optical distortion and correlation operation for detecting the defocus amount, on the image signals.

A signal processing circuit 104 generates an image signal by combining outputs from two photoelectric conversion areas of each pixel into one, and performs optical correction processing, electrical noise reduction processing, demosaic processing, white balance adjustment processing, and the like. An image memory 107 temporarily stores the image signals processed by the signal processing circuit 104. An image processing circuit 105 converts the image signals stored in the image memory 107 into a predetermined video data format. A recording circuit 106 records the image signals converted by the image processing circuit 105, for example, in a recording medium such as a semiconductor memory card. The CPU 109 is a control unit for a digital camera, and realizes an operation of the digital camera, for example, by executing a program stored in a non-volatile memory in a memory 108. The CPU 109 also performs calculation necessary for automatic exposure control or automatic focus detection. The memory 108 has a non-volatile memory and a volatile memory, stores programs executed by the CPU 109 and various types of settings, and is also used, for example, as a work area when the CPU 109 executes a program and to temporarily store various types of data. The focus detection apparatus is mainly configured by the divided image generating circuit 102, the phase difference detecting circuit 103, and the CPU 109.

Figure 2:
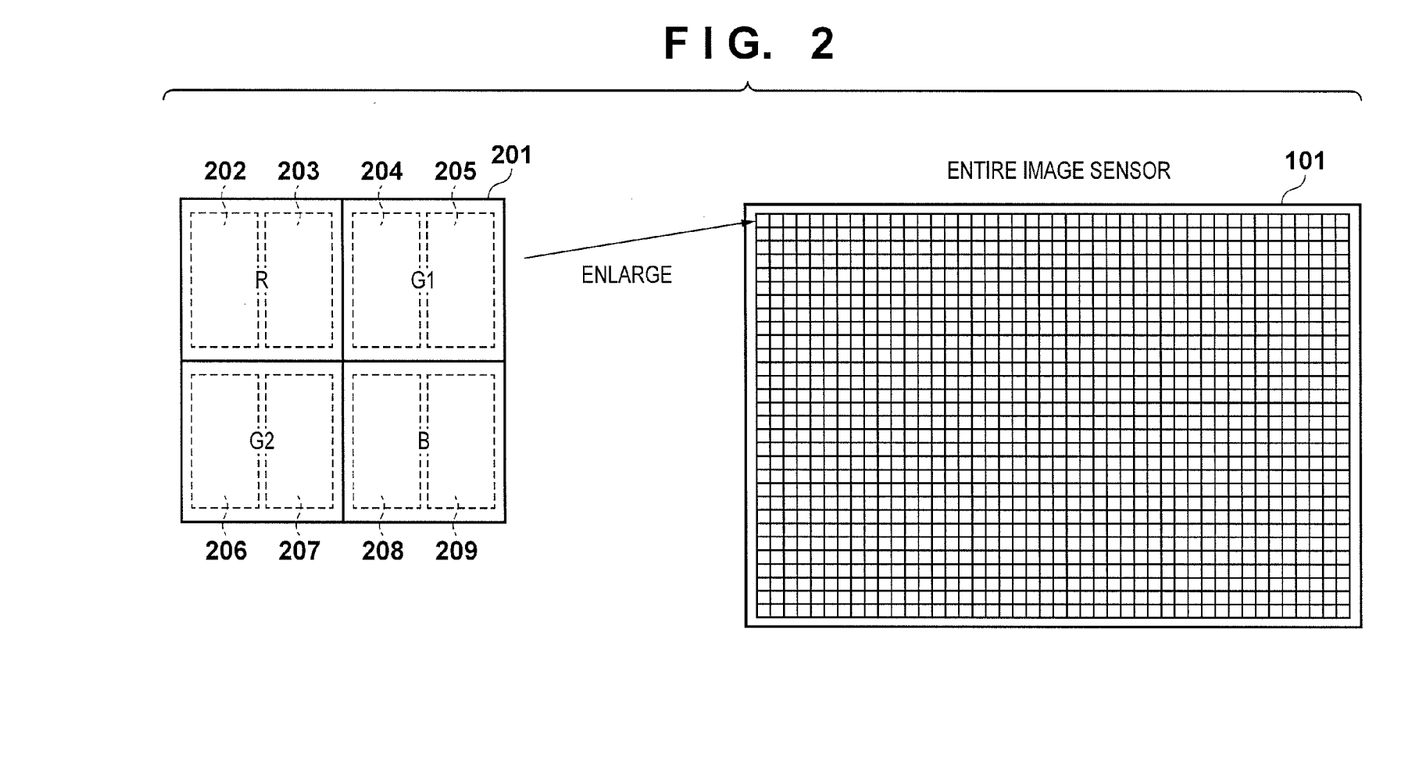
FIG. 2 is a diagram illustrating an exemplary pixel arrangement of an image sensor 101 according to the embodiment.

FIG. 2 is a diagram illustrating an exemplary pixel arrangement of the image sensor 101 in this embodiment. FIG. 2 shows the entire arrangement of pixels, and the configuration of four pixels corresponding to a repeating unit of a color filter, the pixels being extracted from the entire pixels.

The left portion in FIG. 2 shows a pixel block 201 having four pixels consisting of horizontally arranged 2 pixels×vertically arranged 2 pixels, extracted from the pixels of the image sensor 101. The image sensor 101 of this embodiment is provided with a color filter of a primary color Bayer array, and a microlens array formed such that one microlens corresponds to each pixel. Furthermore, in each pixel, two photoelectric conversion areas (or photoelectric conversion elements) obtained by dividing and arranged in a predetermined direction (horizontal direction in this example) are formed. This predetermined direction corresponds to a pupil dividing direction.

Two photoelectric conversion areas sharing the same microlens (i.e., provided in the same pixel) receive light beams that pass through mutually different areas in an exit pupil of the lens unit 100 via the microlens. Accordingly, regarding a plurality of pixels arranged in the horizontal direction, outputs from photoelectric conversion areas provided at the same position in the pixels can be used to generate image signals for focus detection. In the example in FIG. 2, a image signal (referred to as an A image signal) obtained from outputs from a left photoelectric conversion area group and a image signal (referred to as a B image signal) obtained from outputs from a right photoelectric conversion area group can be generated as a pair of image signals for phase difference AF.

For example, an A image signal is obtained from a left photoelectric conversion area group of R and G1 pixels including a photoelectric conversion area 202 of the R pixel and a photoelectric conversion area 204 of the G1 pixel. Furthermore, a B image signal is obtained from a right photoelectric conversion area group of the R and G1 pixels including a photoelectric conversion area 203 of the R pixel and a photoelectric conversion area 205 of the G1 pixel. In a similar manner, regarding a line of G2 and B pixels, an A image signal and a B image signal are respectively obtained from a left photoelectric conversion area group including photoelectric conversion areas 206 and 208 and a right photoelectric conversion area group including photoelectric conversion areas 207 and 209. Note that, in this embodiment, in order to reduce the amount of signals that are to be processed, one combined signal is generated from outputs from photoelectric conversion areas at the same position in a plurality of pixels, and one image signal is generated from a plurality of combined signals, as described later.

If outputs from two photoelectric conversion areas provided in the same pixel are added, a signal output similar to a pixel signal in a conventional image sensor having one photoelectric conversion area in each pixel is obtained.

That is to say, for use in recording or display, outputs from photoelectric conversion areas provided in the same pixel, among output signals (outputs in units of a photoelectric conversion area at this point in time) from the image sensor 101, are added by the signal processing circuit 104 into an image signal for one pixel. After this processing, the image signal may be taken as an output signal obtained from a conventional image sensor. The signal processing circuit 104 applies, to the image signal, known signal processing such as A/D conversion, optical correction processing, electrical correction processing, demosaic processing, or white balance adjustment processing, thereby generating image data, and temporarily stores this image data in the image memory 107.

Then, the image processing circuit 105 applies processing according to the output destination. For example, in the case of performing recording, the image processing circuit 105 converts the image data into a predetermined recording format (moving image/still image format such as MPEG2/4 or JPEG) and outputs the obtained data to the recording circuit 106. Then, the recording circuit 106 records the image data in a recording medium. For example, in the case of performing display, the image processing circuit 105 performs pixel decimation or the like according to the resolution of a display apparatus (not shown) of the image capture apparatus, performs conversion from an RGB format to a YUV format, and writes the obtained data to a display memory (not shown). As described above, the processing after signals are combined (added) into a signal in units of a pixel may be the same as in conventional examples, and, thus, a detailed description thereof has been omitted, and the operation regarding generation of signals for focus detection will be described.

The outputs in units of a photoelectric conversion area are supplied from the image sensor 101 to the divided image generating circuit 102. The divided image generating circuit 102 applies compression processing to the output signals in units of a photoelectric conversion area, in order to reduce the amount of signals that are to be processed for generating image signals for focus detection.

Hereinafter, the compression processing in this embodiment will be described with reference to FIGS. 3A to 3D.

Figure 3A:
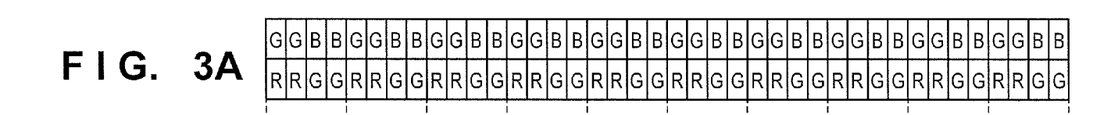
FIGS. 3A to 3D are schematic diagrams illustrating exemplary compression processing according to the embodiment.

FIG. 3A shows an array of photoelectric conversion areas arranged in two horizontal lines, in part of the pixels included in the image sensor 101. In this embodiment, a combined signal obtained by combining signals from a photoelectric conversion area group at the same position is generated for each predetermined pixel block consisting of a plurality of pixels, and such combined signals are as necessary further combined in at least one of the horizontal direction and the vertical direction, generating a image signal.

In this example, a case will be described in which a predetermined pixel block is a repeating unit of a color filter. Since the image sensor 101 of this embodiment uses a color filter of a Bayer array, the pixel block 201 shown in the left portion in FIG. 2 is the repeating unit. Accordingly, the divided image generating circuit 102 performs compression processing in units of four pixels arranged in 2×2.

Using the example in FIG. 2, outputs from four photoelectric conversion areas provided at the corresponding position in the pixels are combined into one, and one combined signal for the A image signal and one combined signal for the B image signal are generated from the four pixels. More specifically, the divided image generating circuit 102 generates one combined signal for the A image signal by combining outputs from the left photoelectric conversion areas 202, 204, 206, and 208, and generates one combined signal for the B image signal by combining outputs from the right photoelectric conversion areas 203, 205, 207, and 209. There is no specific limitation on the combining method, but, in this example, arithmetic average (simple average) is used.

Figure 3B:
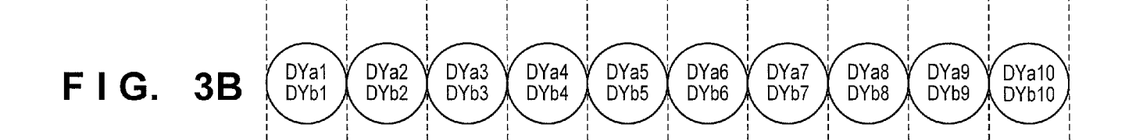

As a result, as shown in FIG. 3B, two combined signals DYan and DYbn (n is 1, 2, 3, . . . ) are obtained from each pixel block (four pixels arranged in 2×2) arranged in the pupil dividing direction, and the amount of signals is compressed to ¼. For example, if the processing power of the phase difference detecting circuit 103 or its following circuits is insufficient, the amount of signals can be compressed by further combining these combined signals.

Figure 3C:
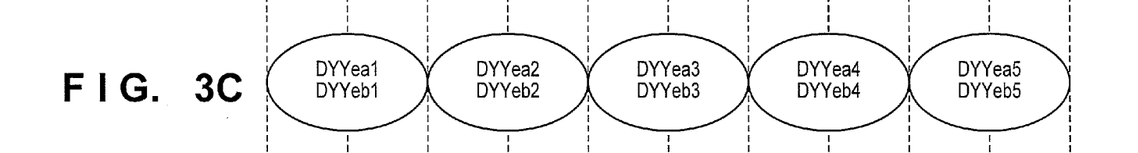

FIG. 3C shows an example in which the combined signals in FIG. 3B are further compressed to ½ in the pupil dividing direction (horizontal direction in this example). This processing is similar to compression in which the predetermined pixel block is two repeating units of the color filter in the horizontal direction. That is to say, DYa1+DYa2 is averaged to generate DYYea1 as a combined signal for the A image signal, and, in a similar manner, signals up to DYYea5 are generated. In a similar manner, DYYeb1 to DYYeb5 are generated as combined signals for the B image signal.

Figure 3D:
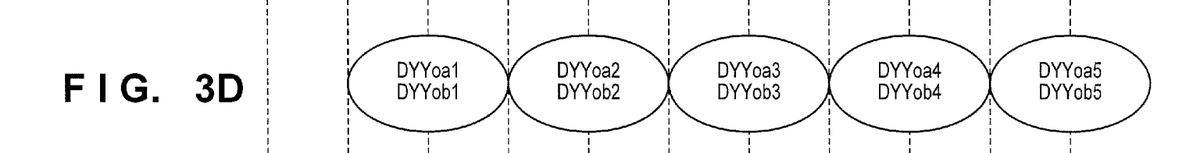

FIG. 3D shows compression that is the same as in FIG. 3C, except that each combined signal is generated such that the boundary position or the central point of a pixel block corresponding to the combined signal has shifted by a half period (such that the phase has shifted by a half period). That is to say, a combined signal for the A image signal is generated by averaging every two successive signals not starting from DYa1 but starting from DYa2. In a similar manner, a combined signal for the B image signal is generated as DYYob1 by performing arithmetic average on DYb2+DYb3, and signals up to DYYob5 are generated.

Hereinafter, a line of combined signals in which the compression ratio in a direction orthogonal to the pupil dividing direction is a reference compression ratio as shown in FIGS. 3A to 3D is referred to as a compression line. A compression line has a configuration in which a plurality of pixel blocks are arranged in the pupil dividing direction, and, thus, it can be also referred to as a pixel block line. In this manner, if compression processing is applied in the pupil dividing direction at a compression ratio higher than the reference, the compression processing is applied such that the boundaries or the central points of pixel blocks corresponding to the combined signals after the compression, in a plurality of compression lines adjacent to each other in a direction orthogonal to the pupil dividing direction, are different from each other in the pupil dividing direction. Ordinarily used focus detection areas have a size in which a plurality of combined signals after the compression processing can be arranged both in the horizontal and the vertical direction, and, thus, such compression processing is possible.

The combined signals are used to generate image signals, and, thus, they can be considered as samples of the image signals, and the compression processing can be considered as a type of sampling. Each sampling period (or interval) of the compression processing at a compression ratio that is twice the reference compression ratio shown in FIGS. 3C and 3D is twice the sampling period of the compression processing at the reference compression ratio shown in FIG. 3B. However, the sampling phase (the boundary or the central point of a group of pixel blocks that are to be combined) has shifted by a half period, and, thus, when both signals in FIGS. 3C and 3D are used, a sampling period (or interval) apparently similar to that of the compression processing at the reference compression ratio is obtained. Accordingly, the level of precision in detecting the defocus amount in this case can be higher than in the case of using signals only in either FIG. 3C or 3D.

What compression ratio to actually apply in the compression processing can be determined, for example, according to the processing power of the phase difference detecting circuit 103 or its following circuits, contents of the processing, a required level of precision in focus detection, or the like, as described above. As the compression ratio is lower, the defocus amount can be detected more precisely, but the signal processing amount increases. For example, if the processing power in following processing is not sufficiently high or if the processing data per unit time is high as in the case of capturing moving images or performing continuous shooting, the compression ratio may be made high. Also, in the case of capturing moving images in which the level of precision in focus detection required is lower than that of still images, the compression ratio may be made high. Furthermore, if the current processing load of the CPU 109 or other circuits is high, the compression ratio may be made higher, and if the processing load is low, the compression ratio may be made lower, and, furthermore, if the number of focus detection areas is large, the compression ratio may be made higher, and if the number is small, the compression ratio may be made lower. For example, such settings of the compression ratio may be fixed by image capture mode or user settings, or may be dynamically changed at the time of focus detection. For example, the settings of the compression ratio may be made by the CPU 109 and notified to the divided image generating circuit 102, or may be made by the divided image generating circuit 102.

In this example, a case was described in which, for the sake of convenience, the compression at the reference compression ratio (FIG. 3B) is first performed, and additional compression processing (FIGS. 3C and 3D) is then performed as necessary. However, if the set compression ratio is higher than the reference compression ratio, final combined signals may be generated by performing compression processing once instead of performing compression processing a plurality of times.

Figure 4:
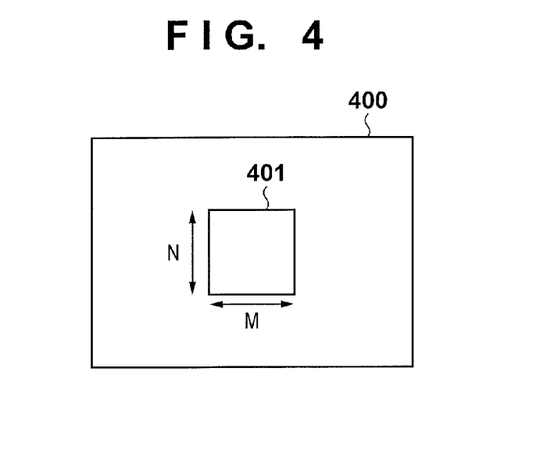
FIG. 4 is a diagram schematically showing a focus detection area.

FIG. 4 is a diagram schematically showing a focus detection area. In this example, for facilitating description and understanding, it is assumed that one focus detection area 401 is set at the center of an image capture range (screen) 400, but a plurality of focus detection areas may be set. It is assumed that, in this embodiment, the focus detection area 401 has a size in which the number of combined signals after the compression processing that can be arranged in the horizontal direction is M and the number of such combined signals in vertical direction is N.

Figure 5:
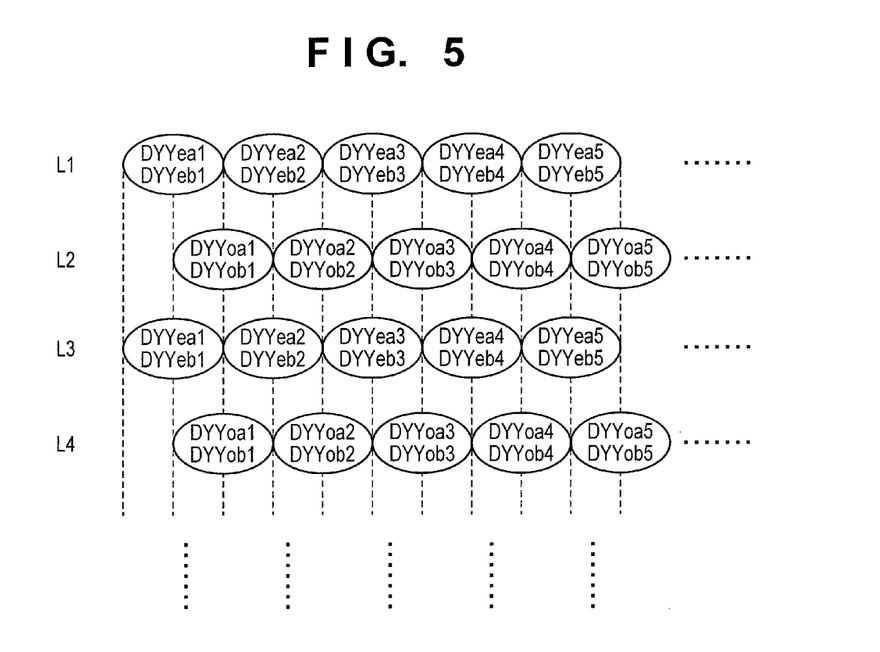
FIG. 5 is a schematic diagram illustrating exemplary compression processing in the horizontal direction according to the embodiment.

It is assumed that, if the reference compression ratio is $1/N$, the compression ratio in the horizontal direction is $1/(2N)$, and the compression ratio in the vertical direction is $1/(4N)$. Furthermore, since the compression ratio in the pupil dividing direction (horizontal direction in this example) is higher than the reference compression ratio, the divided image generating circuit 102 performs compression processing such that the sampling phases, in compression lines adjacent to each other in a direction (vertical direction) orthogonal to the pupil dividing direction, are different from each other. In this example, as shown in FIG. 5, odd-numbered compression lines are subjected to the compression processing shown in FIG. 3C, and even-numbered compression lines are subjected to the compression processing shown in FIG. 3D, so that the sampling phases (the boundaries or the central points of pixel blocks corresponding to the respective combined signals), in compression lines adjacent to each other in the vertical direction, have shifted relative to each other by 180° (half period).

Figure 6:
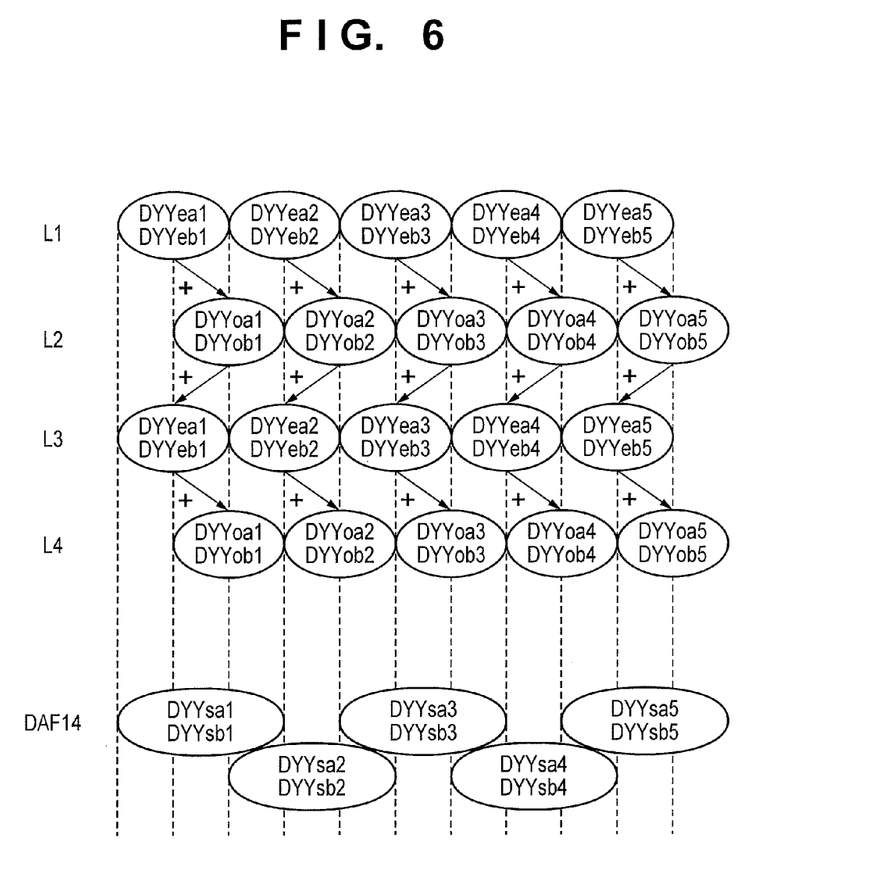
FIG. 6 is a schematic diagram illustrating exemplary compression processing in the vertical direction according to the embodiment.

Next, compression processing in the vertical direction will be described with reference to FIG. 6. FIG. 6 is a schematic diagram illustrating compression processing in the vertical direction in this embodiment, where L1 to L4 are combined signals after the compression processing in the pupil dividing direction shown in FIG. 5.

The divided image generating circuit 102 generates one combined signal by further combining four combined signals adjacent to each other in the vertical direction, among these combined signals. This combining also may be performed using arithmetic average. The divided image generating circuit 102 generates a combined signal DYYea1 for the A image signal by averaging four luminance data sets of DYYea1 in L1, DYYoa1 in L2, DYYea1 in L3, and DYYoa1 in L4. In a similar manner, the divided image generating circuit 102 generates a combined signal DYYsb1 for the B image signal by averaging four luminance data sets of DYYeb1 in L1, DYYob1 in L2, DYYeb1 in L3, and DYYob1 in L4. The divided image generating circuit 102 applies this compression processing to combined signals in the horizontal direction in a similar manner, thereby generating DYYsa2 to DYYsa5 for the A image signal and DYYsb2 to DYYsb5 for the B image signal.

In this manner, the divided image generating circuit 102 reduces the number of signals both in the horizontal direction and the vertical direction, and then generates A and B image signals using outputs from the same type of photoelectric conversion areas. In the example in FIG. 6, an A image signal is generated from DYYsa1 to DYYsaM, and a B image signal is generated from DYYsb1 to DYYsbM. Note that the divided image generating circuit 102 repeats this compression and image signal generating operation for ON pixel lines in the vertical direction in the image sensor, so that N pairs of image signals can be generated.

The N pairs of image signals are supplied to the phase difference detecting circuit 103. The phase difference detecting circuit 103 performs correlation operation on each of the N pairs of image signals while relatively changing the shift amount, and generates a correlation waveform indicating a relationship between the correlation amount and the shift amount.

Figure 7:
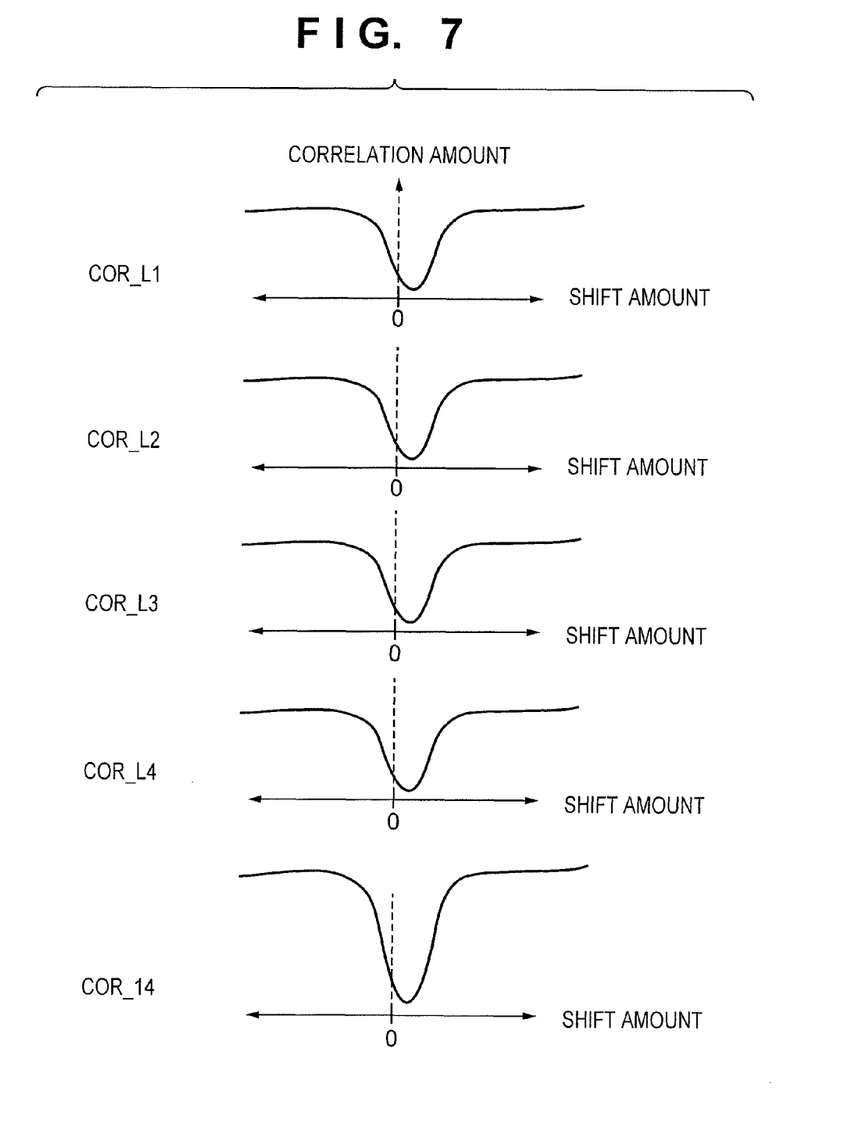
FIG. 7 is a diagram illustrating an exemplary operation of a phase difference detecting circuit 103 according to the embodiment.

In FIG. 7, COR_L1 to COR_L4 are obtained by generating A and B image signals in a state where compression processing in the vertical direction is not performed on L1 to L4 in FIG. 5 or 6, and obtaining a correlation waveform using the phase difference detecting circuit 103. As described above, a correlation waveform indicates a relationship between the relative shift amount and the correlation amount between the A and B image signals, and the vertical axis represents the correlation amount. It is assumed that the correlation is higher if the value on the vertical axis is smaller.

COR_L14 shown in the lowest portion in FIG. 7 shows a result of adding up correlation amounts corresponding to the same shift amount, at each shift amount, in the correlation waveforms in COR_L1 to COR_L4. If a shift amount having the highest correlation (having the smallest correlation amount) is calculated in the correlation amount COR_14, the influence of noise can be reduced, and the defocus amount of subject at the same subject distance (the same defocus amount) can be precisely detected.

In the case where the combined signals after the compression processing have the compression ratio similar to that of the compression lines L1 to L4, when the focus detection area 401 includes N compression lines L1 to LN, the phase difference detecting circuit 103 calculates one shift amount (defocus amount) for every four compression lines, that is, N/4 shift amounts in total. The phase difference detecting circuit 103 obtains a defocus amount at the focus detection area 401, for example, by averaging shift amounts having close values from among the detected N/4 shift amounts. With the averaging, the influence of noise can be further suppressed, and a precise detection result can be obtained.

The CPU 109 obtains a drive direction and a drive amount of the focus lens based on the defocus amount obtained by the phase difference detecting circuit 103 in this manner, and moves the focus lens of the lens unit 100 so as to be positioned at the focus distance using the lens drive circuit 110.

In the description above, if compression is performed in the pupil dividing direction at a compression ratio higher than the reference compression ratio, the boundaries or the central points of pixel blocks corresponding to one combined signal, in compression lines adjacent to each other in a direction orthogonal to the pupil dividing direction, have shifted relative to each other. More specifically, as shown in FIGS. 5 and 6, the boundaries of pixel blocks or the central points of pixel blocks, in an odd-numbered compression line and an even-numbered compression line, have shifted relative to each other exactly by a half period.

Figure 8A:
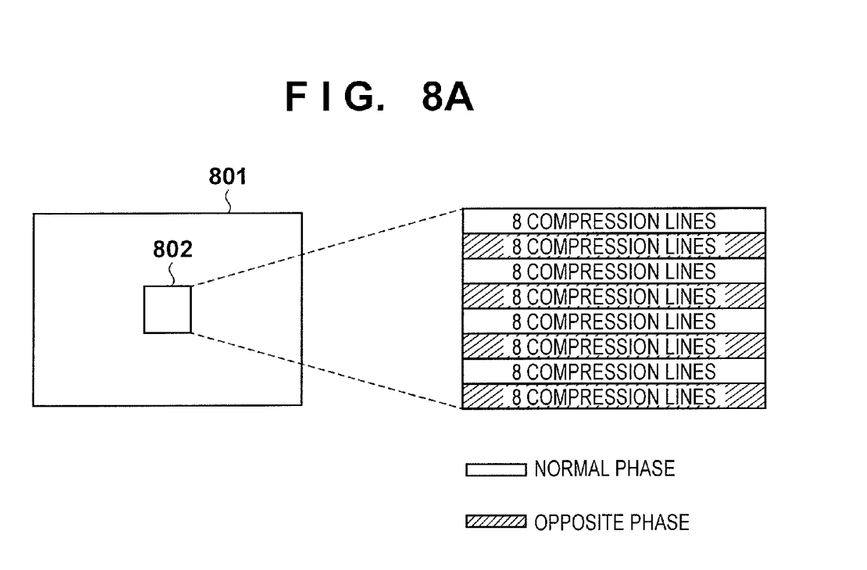
FIGS. 8A and 8B are schematic diagrams illustrating another exemplary compression processing according to the embodiment.
Figure 8B:
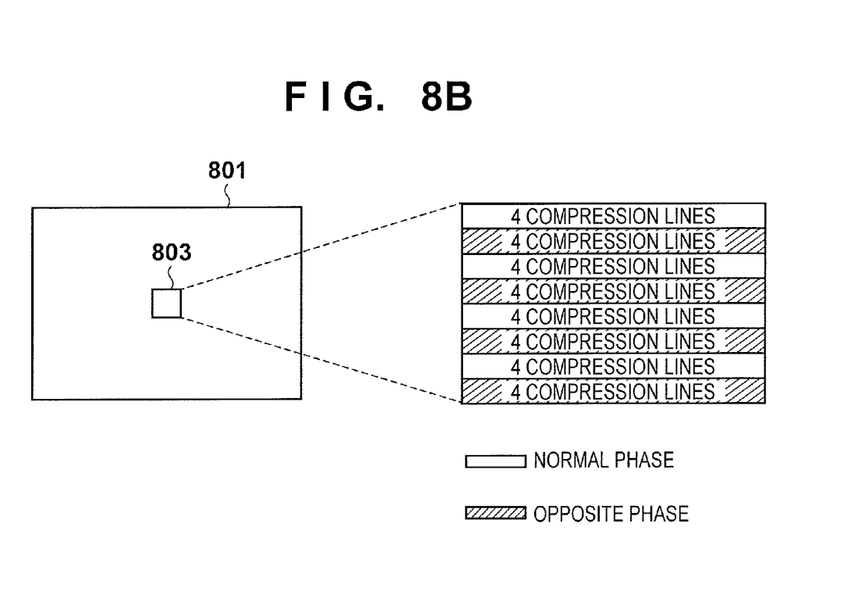

However, it is not absolutely necessary that the boundary periods of pixel blocks or the central points of pixel blocks, in compression lines adjacent to each other, have shifted relative to each other. For example, as shown in FIGS. 8A and 8B, the boundary periods of pixel blocks or the central points of pixel blocks may have shifted every a predetermined plural number of compression lines adjacent to each other in a direction orthogonal to the pupil dividing direction. FIG. 8A shows an example in which compression processing of the type shown in FIG. 3A (referred to as "normal phase" in the drawings) and compression processing of the type shown in FIG. 3B (referred to as "opposite phase" in the drawings) are switched every eight compression lines in a focus detection area 802 set in an image capture range 801. FIG. 8B shows a case in which a smaller focus detection area 803 is set, wherein the normal phase type and the opposite phase type are switched every four compression lines.

In the case where it is assumed that the boundary period of a pixel block or the central point of a pixel block has shifted every a plurality of compression lines in this manner, the compression processing in the vertical direction shown in FIG. 6 and the adding up of correlation waveforms shown in FIG. 7 are performed in units of a group of compression lines of the same type. For example, in the example in FIG. 8A, these processes are performed in units of eight, four, or two compression lines.

Also in the case where it is assumed that the boundary period of a pixel block or the central point of a pixel block has shifted every a plurality of compression lines, the effect similar to that in the case where the boundary period or the central point has shifted every compression line, and, thus, it is possible to perform precise defocus amount detection in which the influence of noise is suppressed, while reducing the data amount.

In this embodiment, a case was described as an example, in which pupil division is performed such that the divided photoelectric conversion areas of pixels are arranged in the horizontal direction. However, those skilled in the art will understand that the present invention can be applied also to a case in which pupil division is performed such that the divided photoelectric conversion areas are arranged in the vertical direction, by switching the horizontal direction and the vertical direction in the description above.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-181565, filed on Sep. 2, 2013, which is hereby incorporated by reference herein in its entirety.

What is claimed is:

1. A focus detection apparatus for detecting a defocus amount of an imaging optical system, from output signals of pixels each of which has a plurality of photoelectric conversion areas being divided in a predetermined direction, comprising:
a combining unit configured to generate combined signals obtained by combining, in units of the photoelectric conversion areas, output signals obtained from each of a plurality of the pixels;
a generating unit configured to generate a plurality of image signals for focus detection, based on the combined signals; and
a detecting unit configured to detect the defocus amount based on a correlation amount between the plurality of image signals,
wherein the combining unit generates, for a plurality of pixel block lines in which pixel blocks each having a predetermined size are arranged in the predetermined direction, the combined signals for each pixel block,
wherein the generating unit generates the plurality of image signals for each pixel block line, and
wherein the combining unit generates the combined signals such that central points of the pixel blocks for generating the combined signals, in each of the plurality of pixel block lines, have shifted relative to each other in the predetermined direction.

2. The focus detection apparatus according to claim 1, wherein, in a case where the number of pixels in the predetermined direction contained in each of the pixel blocks is larger than a predetermined number, the combining unit generates the combined signals such that the plurality of pixel block lines include a pixel block line having different boundary positions of the pixel blocks.

3. The focus detection apparatus according to claim 1, wherein the pixel blocks have a size based on a repeating unit of a color filter provided for the pixels.

4. The focus detection apparatus according to claim 3, wherein, in a case where the pixel blocks have a size of at least two repeating units of the color filter, the combining unit determines that the number of pixels in the predetermined direction contained in each of the pixel blocks is larger than a predetermined number.

5. The focus detection apparatus according to claim 3, wherein, in a case where the pixel blocks have a size of at least two repeating units of the color filter, the combining unit generates the combined signals such that boundary positions of the pixel blocks, in the pixel block lines adjacent to each other, are different from each other.

6. The focus detection apparatus according to claim 3, wherein, in a case where the pixel blocks have a size of at least two repeating units of the color filter, the combining unit generates the combined signals such that boundary positions of the pixel blocks are different every a predetermined plural number of the pixel block lines.

7. The focus detection apparatus according to claim 3, wherein, in a case where the pixel blocks have a size of at least two repeating units of the color filter, the combining unit determines boundary positions of the pixel blocks in each of the plurality of pixel block lines such that the boundary positions of the pixel blocks in the plurality of pixel block lines have the same period as in a case where the pixel blocks have a size equal to the repeating unit.

8. The focus detection apparatus according to claim 1, wherein the detecting unit detects the defocus amount in a predetermined focus detection area, from a defocus amount detected for each pixel block line contained in the focus detection area.

9. The focus detection apparatus according to claim 1, wherein the detecting unit detects a correlation amount between the image signals for each pixel block line contained in a predetermined focus detection area, and detects the defocus amount in the focus detection area from the correlation amount.

10. The focus detection apparatus according to claim 1, further comprising:
a setting unit configured to set the predetermined size;
wherein the setting unit sets the predetermined size according to any of a required level of precision in detecting the defocus amount, a processing power of the detecting unit, and user setting.

11. A focus detection apparatus for detecting a defocus amount of an imaging optical system, from output signals of pixels each of which has a plurality of photoelectric conversion areas being divided in a predetermined direction, comprising:
a combining unit configured to generate combined signals obtained by combining, in units of the photoelectric conversion areas, output signals obtained from each of a plurality of the pixels;
a generating unit configured to generate a plurality of image signals for focus detection, based on the combined signals; and
a detecting unit configured to detect the defocus amount based on a correlation amount between the plurality of image signals,
wherein the combining unit generates, for a plurality of pixel block lines in which pixel blocks each having a predetermined size are arranged in the predetermined direction, the combined signals for each pixel block,
wherein the generating unit generates the plurality of image signals for each pixel block line, and
wherein the combining unit makes phases of positions of the pixel blocks different every pixel block line.

12. The focus detection apparatus according to claim 11, wherein, in a case where the number of pixels in the predetermined direction contained in each of the pixel blocks is larger than a predetermined number, the combining unit generates the combined signals such that the plurality of pixel block lines include a pixel block line having different boundary positions of the pixel blocks.

13. The focus detection apparatus according to claim 11, wherein the pixel blocks have a size based on a repeating unit of a color filter provided for the pixels.

14. An image capture apparatus, comprising:
an image sensor having the pixels;
a focus detection apparatus for detecting a defocus amount of an imaging optical system, from output signals of pixels each of which has a plurality of photoelectric conversion areas being divided in a predetermined direction; and
a control unit for controlling a focus distance of the imaging optical system according to the defocus amount detected by the detecting unit,
wherein the focus detection apparatus comprises:
a combining unit configured to generate combined signals obtained by combining, in units of the photoelectric conversion areas, output signals obtained from each of a plurality of the pixels;

a generating unit configured to generate a plurality of image signals for focus detection, based on the combined signals; and a detecting unit configured to detect the defocus amount based on a correlation amount between the plurality of image signals, wherein the combining unit generates, for a plurality of pixel block lines in which pixel blocks each having a predetermined size are arranged in the predermined direction, the combined signals tbr each pixel block, wherein the generating unit generates the plurality of image signals for each pixel block line, and wherein the combining unit generates the combined signals such that central points of the pixel blocks for generating the combined signals, in each of the plurality of pixel block lines, have shifted relative to each other in the predetermined direction.

15. An image capture apparatus, comprising:

an image sensor having the pixels;

a focus detection apparatus for detecting a defocus amount of an imaging optical system, from output signals of pixels each of which has a plurality of photoelectric conversion areas being divided in a predetermined direction; and control unit for controlling a focus distance of the imaging optical system according to the defocus amount detected by the detecting unit, wherein the focus detection apparatus comprises:

a combining unit configured to generate combined signals obtained by combining, in units of the photoelectric conversion areas, output signals obtained from each of a plurality of the pixels;

a generating unit configured to generate a plurality of image signals for focus detection, based on the combined signals; and a detecting unit configured to detect the defocus amount based on a correlation amount between the plurality of image signals, wherein the combining unit generates, for a plurality of pixel block lines in which pixel blocks each having predetermined size are arranged in the predetermined direction, the combined signals for each pixel block, wherein the generating unit generates the plurality of image signals for each pixel block line; and wherein the combining unit makes phases of positions of the pixel different every pixel block line.

16. A control method for a focus detection apparatus for detecting a defocus amount of an imaging optical system, from output signals of pixels each of which has a plurality of photoelectric conversion areas being divided in a predetermined direction, comprising:

generating combined signals obtained by combining, in units of the photoelectric conversion areas, output signals obtained from each of a plurality of the pixels;

generating a plurality of image signals for focus detection, based on the combined signals; and detecting the defocus amount based on a correlation amount between the plurality of image signals, wherein the combined signals are generated for each pixel block, for a plurality of pixel block lines in which pixel blocks each having a predetermined size are arranged in the predetermined direction, wherein the plurality of image signals are generated for each pixel block line, and wherein the combined signals are generated such that central points of the pixel blocks for generating the combined signals, in each of the plurality of pixel block lines, have shifted relative to each other in the predetermined direction.

17. A control method for a focus detection apparatus for detecting a defocus amount of an imaging optical system, from output signals of pixels each of which has a plurality of photoelectric conversion areas being divided in a predetermined direction, comprising:

generating combined signals obtained by combining, in units of the photoelectric conversion areas, output signals obtained from each of a plurality of the pixels;

generating a plurality of image signals for focus detection, based on the combined signals; and detecting the defocus amount based on a correlation amount between the plurality of image signals, wherein the combined signals are generated for each pixel block, for a plurality of pixel block lines in which pixel blocks each having a predetermined size are arranged in the predetermined direction, wherein the plurality of image signals are generated for each pixel block line, and wherein phases of positions of the pixel blocks are made different every pixel block line.

18. A focus detection apparatus for detecting a defocus amount of an imaging optical system, from output signals of pixels, each of the pixels including first photoelectric conversion area and a second photoelectric conversion area being divided in a first direction, comprising:

a combining unit configured to generate combined signals obtained by combining output signals obtained from the first photoelectric conversion area of each of a plurality of the pixels and combining output signals obtained from the second photoelectric conversion area of each of the plurality of the pixels;

a generating unit configured to generate a plurality of image signals for focus detection, based on the combined signals; and a detecting unit configured to detect the defocus amount based on a correlation amount between the plurality of image signals, wherein the combining unit:

generates, in a first area in which a plurality of pixel blocks are arranged in the first direction, a combined signal for each of the pixel blocks; and generates, in a second area in which a plurality of pixel blocks are arranged in the first direction, a combined signal for each of the pixel blocks, wherein each of the pixel blocks includes a predetermined number of pixels, wherein the first area and the second area have different positions in a second direction orthogonal to the first direction, and wherein central points of the plurality of pixel blocks arranged in the second area are shifted in the first direction against central points of the plurality of pixel blocks arranged in the first area.

19. The focus detection apparatus according to claim 18, wherein boundary positions of the pixel blocks in the first area and boundary positions of the pixel blocks in the second area are different in the first direction.

20. The focus detection apparatus according to claim 18, wherein the predetermined number is changed according to at least one of an image capture mode and user settings.

21. The focus detection apparatus according to claim 20, wherein:

if the predetermined number is larger than a threshold value, the central points of the plurality of pixel blocks arranged in the second area are shifted in the first direction against the central points of the plurality of pixel blocks arranged in the first area; and if the predetermined number is not larger than the threshold value, the central points of the plurality of pixel blocks arranged in the second area are not shifted in the first direction against the central points of the plurality of pixel blocks arranged in the first area.

22. The focus detection apparatus according to claim 18, wherein the predetermined number is based on a repeating unit of a color filter provided for the pixels.

23. A control method for a focus detection apparatus for detecting a defocus amount of an imaging optical system, from output signals of pixels, each of the pixels including first photoelectric conversion area and a second photoelectric conversion area being divided in a first direction, comprising:

generating combined signals obtained by combining output signals obtained from the first photoelectric conversion area of each of a plurality of the pixels and combining output signals obtained from the second photoelectric conversion area of each of the plurality of the pixels;

generating a plurality of image signals for focus detection, based on the combined signals; and detecting the defocus amount based on a correlation amount between the plurality of image signals, wherein the generating combined signals includes:

generating, in a first area in which a plurality of pixel blocks are arranged in the first direction, a combined signal for each of the pixel blocks; and generating, in a second area in which a plurality of pixel blocks are arranged in the first direction, a combined signal for each of the pixel blocks, wherein each of the pixel blocks includes a predetermined number of pixels, wherein the first area and the second area have different positions in a second direction orthogonal to the first direction, and wherein central points of the plurality of pixel blocks arranged in the second area are shifted in the first direction against central points of the plurality of pixel blocks arranged in the first area.

* * * * *